Figure 1:
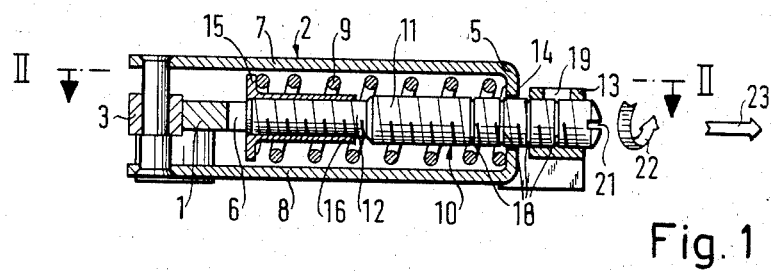

United States Patent [19]

Jungkind

[11] 3,774,925
[45] Nov. 27, 1973

[54] DEVICE FOR ADJUSTING AND INDICATING THE INITIAL STRESS OF RELEASE-OPPOSING SPRINGS IN SAFETY SKI BINDING ELEMENTS

[75] Inventor: Roland Jungkind, Farchant, Germany

[73] Assignee: Hannes Marker, Garmisch-Partenkirchen, Germany

[22] Filed: Feb. 9, 1972

[21] Appl. No.: 224,834

[30] Foreign Application Priority Data
Feb. 16, 1971 Germany.................. P 21 07 376.7

[52] U.S. Cl...................... 280/11.35 T, 74/424.8 B
[51] Int. Cl............................................... A63c 9/00
[58] Field of Search ........................... 280/11.35 T; 267/175, 177; 74/424.8 B

[56] References Cited
UNITED STATES PATENTS
3,682,494   8/1972   Frisch........................... 280/11.35 T
3,596,920   8/1971   Haire............................. 280/11.35 T
3,528,673   9/1970   Myerson......................... 280/11.35 T Primary Examiner—Robert R. Song
Attorney—Martin Fleit et al.

[57] ABSTRACT

A spring abutment is threaded on an adjusting screw, which is carried by a binding element member, in which the spring abutment is mounted to be nonrotatable and displaceable in the axial direction of the adjusting screw. The adjusting screw comprises two portions having the same handed screw threads of different pitch. One of said portions carries the spring abutment and the other screw-threaded portion of the adjusting screw is threaded into a tapped hole of the member which carries said screw.

9 Claims, 3 Drawing Figures

PATENTED NOV 27 1973  3,774,925

DEVICE FOR ADJUSTING AND INDICATING THE INITIAL STRESS OF RELEASE-OPPOSING SPRINGS IN SAFETY SKI BINDING ELEMENTS

The present invention relates to a device for adjusting and indicating the initial stress of release-opposing springs in safety ski binding elements, in which a spring abutment is threaded on an adjusting screw and in a binding element member which carries the adjusting screw is mounted to be non-rotatable and displaceable in the axial direction of the adjusting screw.

In such adjusting and indicating device, a rotation of the screw causes a screwing and continuous displacement of the spring abutment on the adjusting screw. The distance traveled by the spring abutment in response to the rotation of the adjusting screw corresponds to the change of the length of the spring and consequently the change of the initial stress thereof. To ensure that the retaining forces which are exerted on the skiing boot and oppose the release of the ski binding elements are as strong as is required for skiing, very strong springs having a steep spring characteristic are generally used. Even small changes in the length of these strong springs result in large changes of their spring forces. Because strength considerations impose limits as regards the use of fine threads on the screw, even a relatively small rotation of the adjusting screw will result in a relatively large change of the spring force. For this reason an adjustment of the retaining forces exerted by the binding elements to the value which is individual to a skier is very difficult. It is also difficult to read the instantaneous value of the adjusted forces required for a release or the changes of such forces from an indicating device, which is normally coupled to the spring abutment because the displacement of the indicating element does not exceed the travel of the spring abutment or the change of the length of the spring.

The Austrian application A 10514/67 discloses an adjusting and indicating device in which the above-mentioned drawbacks and disadvantages of the conventional adjusting and indicating devices are avoided in that a spring abutment is mounted in a binding housing so as to be displaceable transversely to the direction of the spring action and provided with an oblique surface, which extends in the direction in which the spring abutment is displaceable, and the spring bears on said oblique surface with a pressure member interposed. In this arrangement, the angle of inclination of the oblique surface exceeds 0° and is less than 45° and amounts preferably to 10°. The spring abutment is displaceable, e.g., by means of an adjusting screw, which is rotatably and axially undisplaceably mounted in the binding housing and threaded into a tapped opening of the spring abutment. In response to a displacement of the spring abutment, the pressure member slides along the oblique surface and is thus displaced in the longitudinal direction of the spring so that the latter is more or less compressed. Because the ratio of the displacement of the pressure member to that of the spring abutment is equal to the ratio of the tangent of the angle of inclination to 1, the displacement of the spring abutment exceeds the corresponding displacement of the pressure member, if the angle of inclination is less than 45°. As a result, a small change of the initial stress of the spring can be read from a relatively extended scale in conjunction with a stationary indicating mark. The scale may extend, e.g., along the spring abutment.

This adjusting and indicating device still has various drawbacks and disadvantages, and these may be the reason why it has not yet been successful in practice. The essential disadvantage resides in that the device requires a large space for installation, and this space is available only to a limited extent in modern safety ski bindings. The device also involves a high structural expenditure, particularly because the spring abutment is displaced in a plane which is at right angles to the longitudinal axis of the spring. Because the force is transmitted from the operating head of the screw to the spring by several members, the adjusting and indicating device cannot easily be operated because such operation is opposed by considerable forces due to friction. An even higher structural expenditure is involved in a combination of the adjusting and indicating device with a helical tension spring.

It is an object of the present invention so to improve and design an adjusting and indicating device of the kind described first hereinbefore that the drawbacks and disadvantages of the known adjusting and indicating devices are avoided in a structurally simple arrangement.

In a device for adjusting and indicating the initial stress of release-opposing springs in safety ski binding elements, in which a spring abutment is threaded on an adjusting screw, which is carried by a binding element member, in which the spring abutment is mounted to be nonrotatable and displaceable in the axial direction of the adjusting screw, the above-mentioned object is accomplished according to the invention in that the adjusting screw comprises two portions having the same handed screw threads of different pitch, one of said portions carries the spring abutment, and the other screw-threaded portion of the adjusting screw is threaded into a tapped hole of the member which carries said screw. As a result, a full revolution of the adjusting screw results in a displacement of the spring abutment only by the difference between the pitches of the screw threads. Because the difference between the pitches of the screw threads is preferably at most 0.2 millimeter, a relatively large longitudinal movement of the adjusting screw will result only in a relatively small displacement of the spring abutment. Hence, the initial stress of the spring can be most exactly adjusted, and the instantaneous value of said initial stress can easily be checked as a result of the longitudinal movement of the screw.

To facilitate the operation of the adjusting screw, one end portion of the screw extends suitably from the binding element and is provided with actuating means, e.g., in the form of a radial slot or an actuating head.

To enable an indication of the initial stress of the spring as a function of the instantaneous position of the adjusting screw, the screw may be provided with a scale extending in the longitudinal direction of the screw, and the member which carries the screw may be provided with an indicating mark. If the member which carries the adjusting screw is a housing, the indicating mark may be disposed along at least one edge of a sight opening in the housing.

The adjusting and indicating device according to the invention may be used with a helical compression spring or helical tension spring and does not involve a change of the basic mode of operation of the spring nor a larger structural expenditure.

Figure 2:
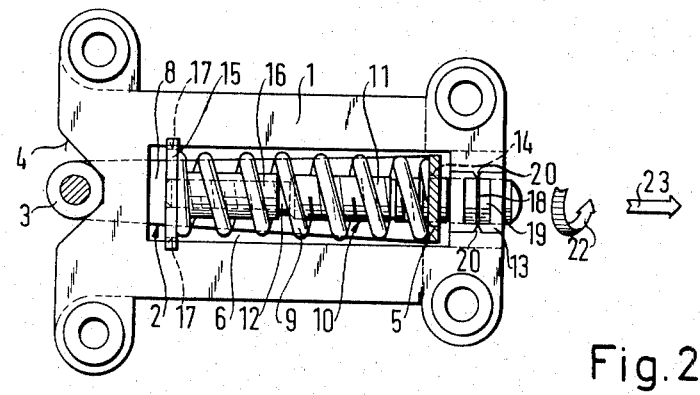
Figure 3:
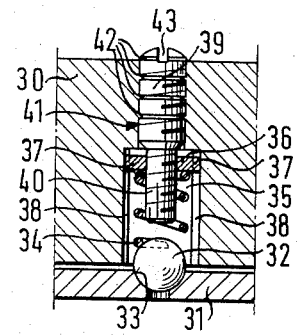

Two embodiments of the invention will be described in detail and by way of example hereinafter with reference to the accompanying drawing, in which FIG. 1 is a central longitudinal sectional view showing a first embodiment of the adjusting and indicating device, FIg. 2 shows the adjusting and indicating device in a sectional view taken on line II—II of FIG. 1 and FIG. 3 is a central longitudinal sectional view showing a second embodiment of the adjusting and indicating device.

The adjusting and indicating device shown in FIGS. 1 and 2 is held by a carrying member 1 of a toe iron which has been chosen by way of example. The design of said toe iron is the main feature of prior German Pat. application P 20 17 849.8. In this toe iron, the soleholders, not shown, are articulatedly connected by a lever mechanism, not shown too, to a tension strap 2, and a roller 3 is rotatably mounted in the rear end portion of said strap and during an outward pivotal movement of the soleholders rolls along a cam face 4 (see FIG. 2) of the carrying member 1. The tension strap 2 consists of a U-shaped member, which has a web 5 that extends vertically through an aperture 6 in the carrying member 1, and also has legs 7 and 8, which respectively extend above and below the carrying member 1 (see particularly FIG. 1). As will be described more fully hereinafter, a helical compression spring 9 is accommodated in the aperture 6 of the carrying member. One end portion of said spring bears on the web 5 of the tension strap 2 to hold the latter and the roller 3 in the normal position shown in the drawing.

The adjusting and indicating device proper comprises an adjusting screw 10, which comprises two screw-threaded portions 11 and 12, which have the same hand and different pitches. The pitch of the screw-threaded portion 11 is 1 millimeter and that of the screw-threaded portion 12 is 0.8 millimeter. The screw-threaded portion 11 of the adjusting screw 10 is threaded into a tapped hole formed in a bearing eye 13 of member 1. That end portion of the screw which is provided with the screw-threaded portion 12 extends through a through bore 14 the web 5 of the tension strap 2 and into the aperture 6. The screw-threaded portion is threaded into a tapped sleeve 16, which is provided with a flange 15 and serves as a second spring abutment for the spring 9, which at its other end bears on the web 5 of the tension strap 2. The spring 9 surrounds the adjusting screw 10. The flange 15 of the tapped sleeve 16 is provided at its periphery with two diametrically opposite recesses 17 (see FIG. 2), which receive two longitudinal edges of the aperture 6. In this way, the tapped sleeve 16 is mounted on the member 1 so as to be nonrotatable but displaceable in the longitudinal direction of the adjusting screw 10.

A scale extends along the forward part of the screw-threaded portion 11 of the adjusting screw 10 and is formed by four spaced apart peripheral grooves 18, which have different colors, each of which is associated with a certain value of the retaining force exerted by the toe iron. Depending on the position of the adjusting screw, one of the scale grooves 18 is visible in a sight opening 19 of the bearing eye 13 so that the adjusted retaining force exerted by the toe iron can be read by reference to indicating marks 20 (see FIG. 2), which are arranged at the two longitudinal edges of the sight opening. For the operation of the adjusting screw 10, the same is provided at its forward end, which protrudes from the bearing eye 13, with a radial slot 21 (see FIG. 1), into which a tool may be inserted.

If the adjusting screw, which may be provided with right-hand screw threads, for instance, is rotated in the direction indicated by the arrow 22, the screw is displaced 2 millimeters in the direction of the arrow 23 for each revolution. At the same time the screw 10 is unscrewed 0.8 millimeter from the tapped sleeve 16, which serves as a spring abutment, for each revolution, because the sleeve 16 is nonrotatably guided on part 1. This results in a displacement of the tapped sleeve 16 by 0.2 millimeter, which is the difference between the pitches of the two screw threads, in the direction of arrow 23, so that the initial stress of spring 9 is increased. Hence, a small displacement of the spring abutment 16 accompanied by a small change of the initial stress corresponds to a relatively large displacement of the screw 10 so that the desired initial stress of the spring can be most exactly adjusted and the adjusted value can be recognized well on the extended scale 18 along the screw. When the adjusting screw 10 is rotated in the direction opposite to the arrow 22, the spring abutment will be displaced opposite to the arrow 23 so that the initial stress of the spring will be reduced.

FIG. 3 shows a second embodiment of the adjusting and indicating device in conjunction with a ball detent mechanism. Two binding members 30 and 31 are releasably interlocked in known manner by a ball detent mechanism, which consists of a detent ball 32, a detent depression 33, and a spring 34, which biases the detent ball 32. The spring 34 is received by a recess 35 of part 30 and at its end which does not bear on the detent ball 32 bears on a spring abutment 36, which is longitudinally held in the aperture 35 to be nonrotatable but longitudinally displaceable. For this purpose, the spring abutment 36 has two noses 37, which extend into mating grooves 38 in member 30.

An adjusting screw 41 comprises two screw-threaded portions 39 and 40 having the same hand and different pitches. The screw-threaded portion 39 of the screw is threaded into a tapped bore of member 30. The other screw-threaded portion 40 of the screw is threaded into a tapped bore of the spring abutment 36. The screw-threaded portion 39 has a pitch of 1 millimeter and the screw-threaded portion 40 has a pitch of 1.2 millimeters. Just as in the illustrative embodiment described before, the upper part of the screw-threaded portion 39 of the adjusting screw 41 is provided with four spaced apart peripheral grooves 42 in different colors. These peripheral grooves form again a scale, from which the adjusted initial stress of the spring and with it the retaining force exerted by the binding element can be recognized. The indicating mark is formed by the upper boundary surface of the binding member 30.

This adjusting and indicating device has the same mode of operation as the embodiment described before. A rotation of the adjusting screw 41 is enabled in that the screw is provided at its upper end with a radial slot 43 for engagement by a tool. As a result of such rotation, the spring abutment is displaced by the difference between the thread pitches for each revolution. Hence, a small change of the initial stress of the spring 34 is accompanied by a relatively large displacement of the adjusting screw 41 so that the change of the initial stress and the instantaneous adjusted value can easily be detected.

Particularly from FIGS. 1 and 2, it is apparent to a person having average skill in the ski binding field that the adjusting and indicating device according to the invention may be used to the same advantage and without higher structural expenditure in conjunction with a helical tension spring. As an alternative to a helical spring, any desired known spring element may be used.

What is claimed is:

1. In a device for adjusting and indicating the initial stress of a spring for opposing the release of a ski binding in which the spring abuts a spring abutment threaded on an adjusting screw carried by a binding element of the ski binding and in which the spring abutment is non-rotatably mounted but displaceable in the axial direction of the adjusting screw for varying the initial stress of the spring, the improvement comprising the adjusting screw having two portions with screw threads of different pitch in which the screw threads on each portion move in the same direction when the adjusting screw is rotated, the binding element carrying the adjusting screw having a tapped hole, and one of the screw-threaded portions of the adjusting screw being threaded into the spring abutment and the other screw-threaded portion being threaded into the tapped hole so that rotation of the adjusting screw causes the spring abutment to move a distance equal to the difference between the pitches of the screw-threaded portions of the adjusting screw.

2. The adjusting and indicating device of claim 8 in which the difference between the pitches of the screw threads is at most 0.2 millimeter.

3. The adjusting and indicating device of claim 8 in which a portion of the screw extends from the binding element and is provided with actuating means for turning the screw.

4. The adjusting and indicating device of claim 10 in which the actuating means is a radial slot formed in the head of the screw.

5. The adjusting and indicating device of claim 8 in which the screw has a scale extending in the longitudinal direction thereof and the binding element which carries the screw is provided with an indicating mark for reading the initial stress of the spring.

6. The adjusting and indicating device of claim 12 in which the binding element which carries the screw is a housing having a sight opening and in which the indicating mark is disposed along at least one edge of the opening.

7. The adjusting and indicating device of claim 8 in which the spring is a helical compression spring.

8. The adjusting and indicating device of claim 8 in which the spring is a helical tension spring.

9. The adjusting and indicating device of claim 8 in which the portion of the adjusting screw which is threaded into the spring abutment has the smaller of the two pitches.

* * * * *